United States Patent
Ortiz et al.

(10) Patent No.: US 11,922,189 B2
(45) Date of Patent: Mar. 5, 2024

(54) DATABASE FRAMEWORK MODEL TRANSFORMATION FOR PATHWAY IDENTIFICATION

(71) Applicant: Evicore Healthcare MSI, LLC, Bluffton, SC (US)

(72) Inventors: Robinson Ortiz, South Barrington, IL (US); Colleen H. Karvetski, Charlottesville, VA (US); Lauren Murray, Youngsville, NC (US); Stephen A. Hamilton, Edmond, OK (US); Eric J. Gratias, Savannah, GA (US)

(73) Assignee: Evicore Healthcare MSI, LLC, Bluffton, SC (US)

( * ) Notice: Subject to any disclaimer, the term of this patent is extended or adjusted under 35 U.S.C. 154(b) by 0 days.

(21) Appl. No.: 17/971,685

(22) Filed: Oct. 24, 2022

(65) Prior Publication Data

US 2023/0043370 A1    Feb. 9, 2023

Related U.S. Application Data

(63) Continuation of application No. 17/145,692, filed on Jan. 11, 2021, now Pat. No. 11,481,235.

(51) Int. Cl.
*G06F 9/451* (2018.01)
*G06F 3/0482* (2013.01)
(Continued)

(52) U.S. Cl.
CPC ............ *G06F 9/451* (2018.02); *G06F 3/0482* (2013.01); *G06F 3/0483* (2013.01); *G06F 16/212* (2019.01); *G06F 3/0481* (2013.01)

(58) Field of Classification Search
None
See application file for complete search history.

(56) References Cited

U.S. PATENT DOCUMENTS 8,489,334 B2   7/2013  Chen
9,705,890 B2   7/2017  Chen
(Continued)

OTHER PUBLICATIONS

ASCO, Value Framework Net Health Benefit Worksheet: Advanced Disease Setting, https://www.asco.org/sites/new-www.asco.org/files/content-files/practice-and-guidelines/documents/2020-NHB-advanced-disease-setting-worksheet.pdf; as early as Oct. 30, 2020.

*Primary Examiner* — Tuyetlien T Tran
(74) *Attorney, Agent, or Firm* — Miller Johnson (57) ABSTRACT

A pathway identification system includes processor and memory hardware. The memory hardware stores a pathway database including pathways corresponding to at least one pathway parameter, a framework database including a set of framework transformation models, and instructions. The instructions include, in response to receiving a first pathway parameter corresponding to a user, identifying a subset of pathways of the pathways corresponding to the first pathway parameter. The instructions include obtaining a first set of framework transformation models from the framework database, determining a pathway value for each pathway of the subset of pathways using the first set of framework transformation models, and selecting at least one pathway of the subset of pathways based on the corresponding pathway value. The instructions include transmitting information encoding the at least one pathway to the operator device and transforming a user interface of the operator device to display the at least one pathway.

20 Claims, 9 Drawing Sheets

(51) Int. Cl.
*G06F 3/0483* (2013.01)
*G06F 16/21* (2019.01)
*G06F 3/0481* (2022.01)

(56) References Cited

U.S. PATENT DOCUMENTS

| | | | |
|---|---|---|---|
| 10,223,475 B2 | 3/2019 | Johnson | |
| 10,530,661 B2 | 1/2020 | Kanza | |
| 2002/0004725 A1* | 1/2002 | Martin | G06Q 40/08 |
| | | | 705/2 |
| 2005/0119914 A1* | 6/2005 | Batch | G06Q 10/10 |
| | | | 705/2 |
| 2005/0154535 A1* | 7/2005 | Sun | G16B 5/00 |
| | | | 702/19 |
| 2012/0158391 A1* | 6/2012 | Vaske | G16H 50/30 |
| | | | 703/11 |
| 2013/0304496 A1 | 11/2013 | Rangadass | |
| 2016/0103949 A1* | 4/2016 | Benz | G16B 5/00 |
| | | | 703/11 |
| 2016/0239619 A1* | 8/2016 | Abou-Hawili | G16H 40/20 |
| 2016/0354157 A1* | 12/2016 | Chen | G06T 7/73 |
| 2016/0378919 A1* | 12/2016 | McNutt | G16H 40/63 |
| | | | 705/3 |
| 2017/0372029 A1* | 12/2017 | Saliman | G16H 10/60 |
| 2018/0075194 A1* | 3/2018 | Allen | G16H 70/20 |
| 2018/0232883 A1* | 8/2018 | Sethi | G16H 30/40 |
| 2018/0369611 A1* | 12/2018 | Owens | A61N 5/1031 |
| 2019/0143147 A1* | 5/2019 | Isola | A61N 5/103 |
| | | | 378/65 |
| 2019/0164630 A1 | 5/2019 | Chen | |
| 2020/0051674 A1* | 2/2020 | Long | G16H 10/60 |
| 2020/0058376 A1* | 2/2020 | Dean | G16B 40/00 |
| 2020/0303057 A1 | 9/2020 | Singh | |
| 2020/0389495 A1 | 12/2020 | Crabtree | |
| 2021/0012898 A1* | 1/2021 | Santos | G16H 70/20 |
| 2021/0022688 A1* | 1/2021 | Lee | G16H 50/70 |
| 2021/0057042 A1* | 2/2021 | Beaubier | G16B 30/10 |
| 2021/0134444 A1* | 5/2021 | Redlus | G16H 50/30 |
| 2021/0151172 A1* | 5/2021 | Dean | H04L 67/12 |

\* cited by examiner

First Framework — 404

| Original Value | Updated Value |
|---|---|
| 5 | 30 |
| 4 | 15 |
| 3 | 0 |
| 2 | -15 |
| 1 | -30 |

Second Framework — 408

| Original Value | Updated Value |
|---|---|
| >95 | 60 |
| 45 though 95 | $1 + \left(\dfrac{Original\ Value - 45}{50}\right) * 58$ |
| 40 through 45 | 0 |
| -20 through 39 | $-60 + \left(\dfrac{Original\ Value - (-20)}{59}\right) * 59$ |

Third Framework — 412

| Original Value | Updated Value |
|---|---|
| >19 | 10 |
| 10 through 19 | $-9 + (Original\ Value - 10) * 2$ |
| <10 | -10 |

Fourth Framework — 416

| Original Value | Updated Value |
|---|---|
| 1 | 25 |
| 2A | 0 |
| 2B | -25 |

Fifth Framework — 420

| Original Value | Updated Value |
|---|---|
| Preferred | 10 |
| Other recommended | 0 |
| Useful in certain circumstances | -10 |

DATABASE FRAMEWORK MODEL TRANSFORMATION FOR PATHWAY IDENTIFICATION

CROSS REFERENCE TO RELATED APPLICATIONS

This application is a continuation of U.S. application Ser. No. 17/145,692, which was filed Jan. 11, 2021. The entire disclosure of said application is incorporated herein by reference.

FIELD

The present disclosure relates to transformation of user interfaces and more particularly to transforming user interfaces according to framework database analyses.

BACKGROUND

Various scoring methodologies are used to determine the value of certain treatments for corresponding diagnoses. To implement the scoring methodologies, time intensive worksheets allow a medical provider to calculate a score. However, while various institutions have scoring methodologies, the scoring methodologies across various institutions cannot be easily combined or compared.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A pathway identification system includes processor hardware and memory hardware coupled to the processor hardware. The memory hardware stores a pathway database including pathways. Each pathway corresponds to at least one pathway parameter. The memory hardware stores a framework database including a set of framework transformation models. The memory hardware stores instructions for execution by the processor hardware. The instructions include, in response to receiving a first pathway parameter corresponding to a user from an operator device, identifying a subset of pathways of the pathways corresponding to the first pathway parameter. The instructions include obtaining a first set of framework transformation models from the framework database, determining a pathway value for each pathway of the subset of pathways using the first set of framework transformation models, and selecting at least one pathway of the subset of pathways based on the corresponding pathway value. The instructions include transmitting information encoding the at least one pathway to the operator device and transforming a user interface of the operator device to display the at least one pathway.

In other features, the subset of pathways are identified based on the first pathway parameter. In other features, the first set of framework transformation models value each pathway based on at least one of: (i) efficacy, (ii) toxicity, (iii) evidence, and (iv) life quality. In other features, the instructions include selecting a set of indicted pathways with a corresponding pathway value above a threshold.

In other features, the instructions include, in response to the set of indicated pathways including more than one pathway, obtaining a second set of framework transformation models from the framework database and determining an adjusted pathway value for the set of indicated pathways by adding to the pathway value for each indicated pathway of the set of indicted pathways using the second set of framework transformation models.

In other features, the instructions include selecting a final pathway of the set of indicated pathways based on the corresponding adjusted pathway value of each of the set of indicated pathways and transmitting information encoding the final pathway to the operator device to transform the user interface of the operator device. In other features, the instructions include generating a first user-selectable link corresponding to the at least one pathway.

In other features, the instructions include, in response to receiving a first selection of the first user-selectable link, transmitting the first selection to a corresponding entity and displaying, on the user interface of the operator device, approval of the first selection. In other features, the instructions include generating a second user-selectable link corresponding to the subset of pathways other than the at least one pathway and, in response to receiving a second selection of the second user-selectable link, navigating the operator device to a page including a list of the subset of pathways other than the at least one pathway. In other features, the first pathway parameter includes at least one of: (i) a diagnosis, (ii) a stage, (iii) a symptom, and (iv) a comorbidity.

A pathway identification method includes, in response to receiving a first pathway parameter corresponding to a user from an operator device, identifying a subset of pathways of pathways corresponding to the first pathway parameter. A pathway database includes the pathways, and each pathway corresponds to at least one pathway parameter. The method includes obtaining a first set of framework transformation models from a framework database. The framework database includes a set of framework transformation models. The method includes determining a pathway value for each pathway of the subset of pathways using the first set of framework transformation models and selecting at least one pathway of the subset of pathways based on the corresponding pathway value. The method includes transmitting information encoding the at least one pathway to the operator device and transforming a user interface of the operator device to display the at least one pathway.

In other features, the subset of pathways are identified based on the first pathway parameter. In other features, the first set of framework transformation models value each pathway based on at least one of: (i) efficacy, (ii) toxicity, (iii) evidence, and (iv) life quality. In other features, the pathway identification method includes selecting a set of indicted pathways with a corresponding pathway value above a threshold.

In other features, the pathway identification method includes, in response to the set of indicated pathways including more than one pathway, obtaining a second set of framework transformation models from the framework database and determining an adjusted pathway value for the set of indicated pathways by adding to the pathway value for each indicated pathway of the set of indicted pathways using the second set of framework transformation models.

In other features, the pathway identification method includes selecting a final pathway of the set of indicated pathways based on the corresponding adjusted pathway value of each of the set of indicated pathways and transmitting information encoding the final pathway to the operator device to transform the user interface of the operator device. In other features, the pathway identification method includes generating a first user-selectable link corresponding to the at least one pathway.

In other features, the pathway identification method includes, in response to receiving a first selection of the first user-selectable link, transmitting the first selection to a corresponding entity and displaying, on the user interface of the operator device, approval of the first selection.

In other features, the pathway identification method includes generating a second user-selectable link corresponding to the subset of pathways other than the at least one pathway and, in response to receiving a second selection of the second user-selectable link, navigating the operator device to a page including a list of the subset of pathways other than the at least one pathway. In other features, the first pathway parameter includes at least one of: (i) a diagnosis, (ii) a stage, (iii) a symptom, and (iv) a comorbidity.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

A pathway identification system generates a pathway recommendation for operators, such as medical providers, automatically and in real time based on a user's diagnosis. In this context, real time means that a pathway recommendation is displayed to an operator in the same session where the operator made the request. In other words, the operator does not need to wait minutes, hours, or even days for generation of the pathway recommendation.

As an example, when a user (such as a patient) is evaluated by an operator, the operator may diagnose the user based on a variety of clinical symptoms and test results. The diagnosis indicates a variety of pathways or treatment options from which the operator can select. Each pathway has positives and negatives based on certain parameters or criteria with which the pathway has been evaluated. These parameters may be used to determine an overall value of a particular pathway. For example, the criteria may evaluate the pathway based on clinical efficacy, toxicity, level of evidence, quality-adjusted life year, affordability, etc.

In various implementations, the pathway identification system prompts the operator with a set of questions about the user via a user interface of an operator device, such as a mobile phone, tablet, computer, etc. The operator inputs answers to the set of questions. In some cases, answers are retrieved and/or generated by an automated system based, for example, on medical history data stored for the user. In response to the answers, the pathway identification system identifies a set of pathways. The set of pathways may simply be based on a diagnosis listed in the answers. In various implementations, the set of pathways may be based on other answers, such as clinical symptoms, stage, specific type of diagnosis, etc.

The pathway identification system may include multiple databases storing a plurality of pathways. The stored pathways may be associated with information obtained from answers to the set of questions, such as particular diagnoses, stages, etc. Once the set of pathways pertaining to the diagnosis of the particular user are identified, the pathway identification system evaluates the pathway options based on a set of frameworks. The pathway identification system may also store evaluation frameworks that balance the above-listed criteria, such as clinical efficacy, toxicity, level of evidence, quality-adjusted life year, affordability, etc., for the pathways that have been identified.

The evaluation frameworks are based on existing, reputable methods for assessing value of the identified pathways. For example, the evaluation frameworks are based on known treatment scoring techniques developed by existing organizations or entities. For example, for a pathway identification system directed to oncology diagnoses and treatments, the pathway identification system may include evaluation frameworks developed by the European Society for Medical Oncology (ESMO), the American Society of Clinical Oncology (ASCO), the National Comprehensive Cancer Network (NCCN), etc. In various implementations, the pathway identification system may be directed toward a particular cohort or group of individuals with the same high-level diagnosis, such as cancer.

The pathway identification system may include a number of evaluation tiers. For example, a first tier may include the above-listed evaluation frameworks from a variety of organizations to calculate an initial value using only certain elevation frameworks directed to specific criteria. For example, the first tier may only include evaluation frameworks based on clinical efficacy, toxicity, level of evidence, and quality-adjusted life year. Then, if multiple pathways are within a range threshold of one another, the pathway identification system may implement a second tier evaluation framework to further reduce the number of pathway options using additional frameworks based on other criteria. Alternatively, the pathway identification system may implement the second tier evaluation framework if multiple pathways are above a threshold value. For example, the second tier may consider overall cost of the corresponding pathway.

In various implementations, the selected evaluation frameworks may be transformed from the original organization's scoring structure to further separate certain pathways from other pathways based on the previously mentioned criteria. For example, the original scoring framework by ESMO may apply a value from one to five to the plurality of pathways stored in the database. Instead, the pathway identification system may transform the scoring structure to a range of −30 to 30, providing a corresponding new value to each of the original values. Such a transformation may be implemented by the pathway identification system for each framework. The transformation for each framework may not be universal and instead be generated to appropriately capture the impact of a change between values within the original framework, by reducing the value change, maintaining the value change, or increasing the value change in the transformation values. For example, in an example transformation framework, an increase from original value 1 to original value 2 may transform to a larger difference than the transformed difference between original value 3 and original value 4.

Moreover, the transformation of each framework may weigh the corresponding framework differently to more or less heavily influence a combined overall value for each pathway. For example, since the original evaluation frameworks incorporate clinical efficacy indicating the best clinical outcomes, for example, based on review of peer-reviewed published articles in high-impact clinical journals; toxicity; level of evidence indicating how long the pathway has existed in peer-reviewed literature; etc., in different ways, certain frameworks may be considered to more accurately represent the value of various pathways. Therefore, a first framework (for example, corresponding to ESMO) may be less heavily weighted than a second framework (for example, ASCO) according to the mapped transformation techniques of the pathway identification system.

The pathway identification system calculates the overall value corresponding to each identified pathway using the set of frameworks based on a combination of the resulting framework values. Alternatively, the framework values may be averaged and weighted based on reliability of the particular framework. The pathway identification system can filter the set of pathways based on the overall value corresponding to each pathway and select a pathway with the highest overall value. In various implementations, the pathway identification system may identify multiple pathways by selecting pathways with an overall value above a threshold value. The pathway identification system may transmit and identify zero, one, or multiple pathways from which the operator can select.

In various implementations, if multiple pathways are indicated based on the overall value determined in the first tier, the pathway identification system may further score the indicated pathways using the second tier. As described above, the second tier may incorporate a transformed framework based on cost, overall or to the user, of the indicated pathways. Once the overall values of the indicated pathways are adjusted using frameworks included in the second tier, the pathways are filtered again based on the adjusted overall value. The pathway identification system may select the pathway with the highest adjusted overall value. In various implementations, the pathway identification system may select multiple pathways if the difference between the updated overall scores of the remaining pathways does not exceed a range threshold.

After identifying the highest valued pathway or pathways, the pathway identification system transmits the pathways to the operator of the operator device that input the answers to the set of questions. The user interface of the operator device is transformed to indicate the identified pathways. In various implementations, the operator is offered the option of selecting one of the identified pathways as the course of treatment for the corresponding user. If the identified pathway is selected, the pathway is automatically approved by a corresponding insurance organization. In various implementations, if the operator and user select a pathway other than one of the identified pathways, a flag may be generated and transmitted to the corresponding insurance organization or provider, including the identified pathway and the selected pathway. In various implementations, the corresponding insurance organization may forward the flag to an analyst associated with the entity to contact the operator and discuss the various pathways and differences in overall value of each pathway.

Figure 1:
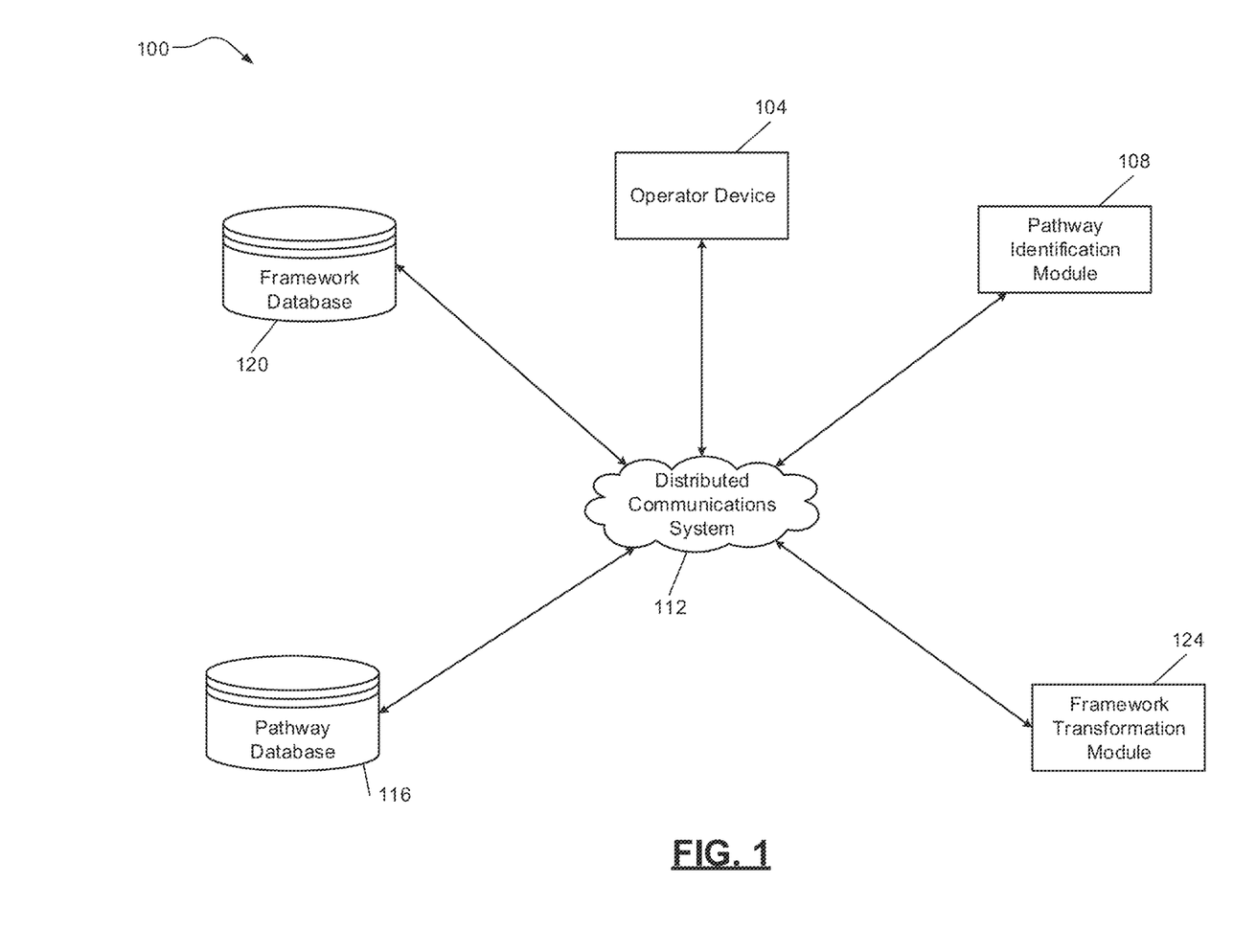
FIG. 1 is a high-level functional block diagram of an example pathway identification system.

FIG. 1 is a high-level functional block diagram of an example pathway identification system 100. The pathway identification system 100 includes an operator device 104 that receives prompts from a pathway identification module 108 via a distributed communications system 112. The operator device 104 may include a mobile phone, tablet, computer, etc. The operator device 104 can receive questions or prompts from the pathway identification module 108 to identify a pathway identifier stored in a pathway database 116 that is indicated based on the answers submitted on the operator device 104. For example, an operator of the operator device 104 may be answering questions about a particular user regarding a particular diagnosis. The questions may include submitting a variety of different clinical symptoms the user is experiencing, a specific diagnosis, a stage of the diagnosis, test results, age, etc.

To determine the most valuable treatment pathway for the operator to recommend or administer to the user, the operator submits answers via the operator device 104, which are transmitted to the pathway identification module 108. The pathway identification module 108 identifies pathway identifiers stored in the pathway database 116 that are related to or indicated by the submitted answers. For example, particular pathway options may only be relevant to, for example, stage four lung cancer. The pathway database 116 may include, for each pathway identifier, at least one corresponding diagnosis for which the pathway would be implemented. The pathway identification module 108 calculates an overall value of each identified pathway based on evaluation framework data stored in a framework database 120. In various implementations, while the pathways are described as treatment courses, the pathway may also correspond to prescription of a particular drug.

The evaluation frameworks may each have individual, calculated values that are combined to determine the overall value. A pathway identifier from the pathway identifiers is selected as being of the highest value based on the overall values of the pathway identifiers. For example, in the implementation described, the pathway identifier corresponding to the highest overall value indicates the pathway of the highest value and outcome for the corresponding user. In various implementations, the pathway identification module 108 may filter the pathway identifiers based on the overall values to identify the highest overall values or those overall values above a threshold.

If the pathway identification module 108 identifies multiple pathway identifiers corresponding to overall values above the threshold, the pathway identification module 108 applies additional framework models stored in the framework database 120 to adjust the overall scores. For example, the first tier of calculations may include evaluation frameworks from organizations described above (ESMO, ASCO, NCCN, etc.) that evaluated clinical efficacy, toxicity, level of evidence, etc. Then, if the pathway identification module 108 identifies multiple potential pathways, the second tier or frameworks may consider cost to further reduce the number of pathway results. The second tier frameworks apply transformed frameworks to the remaining pathways and add the resulting framework values to the overall value.

The pathway identification module 108 filters the remaining pathways to identify which pathway is most valuable for the user. As described above, the filtering may include identifying the highest overall value. Additionally or alternatively, the pathway identification module 108 may select multiple pathway identifiers corresponding to the highest overall values if a difference between the overall values do not exceed a range threshold.

Still, the pathway identification module 108 may transmit one or multiple pathway identifiers to the operator device 104 and transform the user interface of the operator device 104 to include the identified pathways. The operator may select one of the identified pathways on the operator device 104, which is automatically approved by the corresponding insurance organization of the user.

In various implementations, the operator may select to review alternative pathways that correspond to the answers submitted by the operator, but were not indicated as most valuable. Further, if the operator selects a pathway that is not indicated, the pathway identification module 108 may flag the selection for further review and intervention by an analyst. The intervention may include the analyst, who is associated with the insurance organization, contacting the operator to discuss the pathway options and course of action in the best interest of the user.

The pathway identification system 100 may also include a framework transformation module 124 to update or adjust framework transformation models stored in the framework database 120. For example, an analyst associated with the insurance organization may adjust weighting of the different frameworks. Additionally, if organizations generating the original frameworks adjust the frameworks, the analyst may update frameworks stored in the framework database 120 accordingly.

Figure 2:
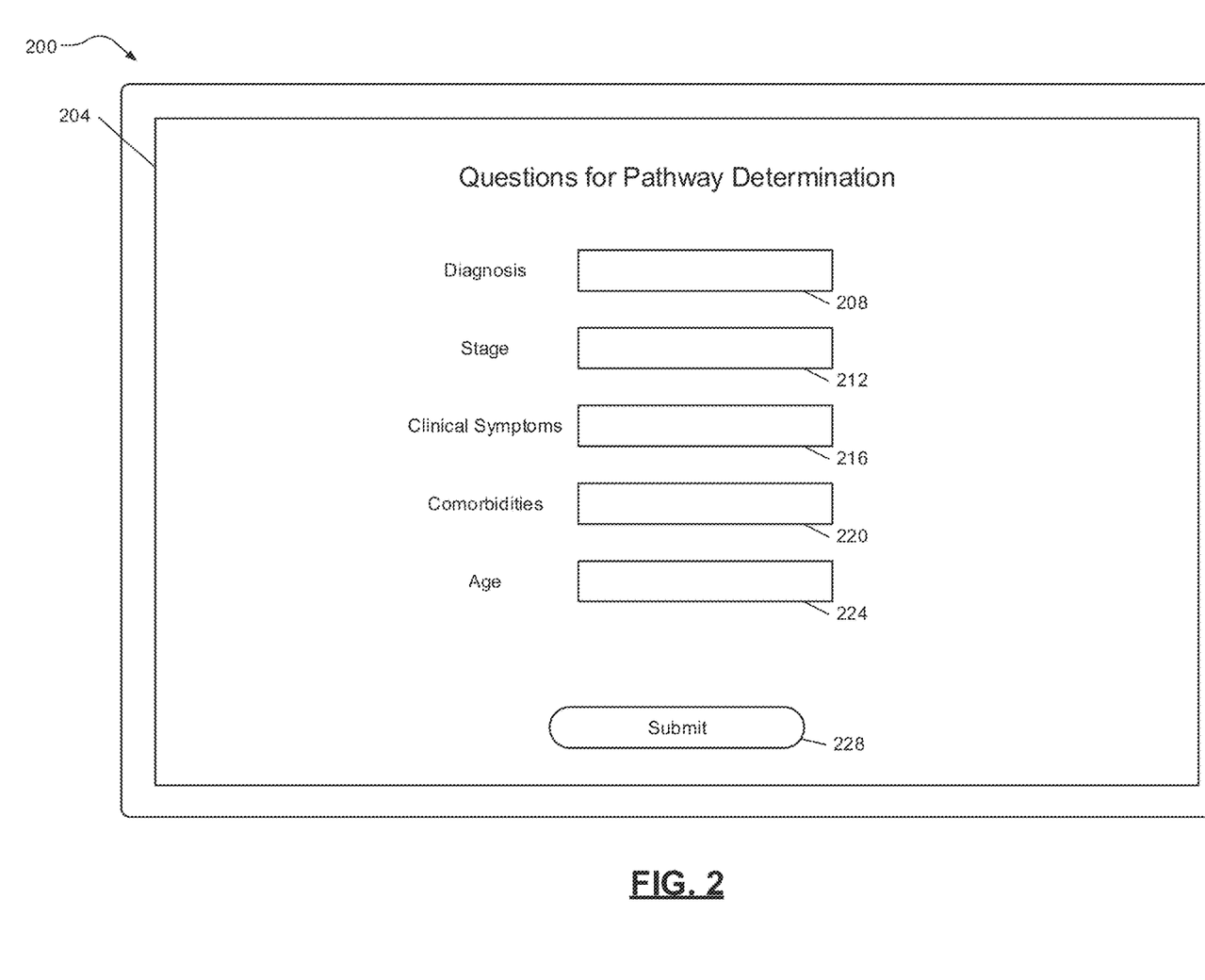
FIG. 2 is an example user interface depicting an operator entry form of a pathway identification system.

FIG. 2 is an example user interface depicting an operator entry form 200 of a pathway identification system. The operator entry form 200 may be displayed on a user interface 204 of the operator device 104 described in FIG. 1. The operator entry form 200 may include fields to enter a diagnosis 208, a stage 212, clinical symptoms 216, comorbidities 220, age 224, etc. In various implementations, the fields may be drop-down menus. The operator enters the relevant information on the operator device and selects a submit button 228 to continue to a results page including the indicated pathways based on the user information entered on the operator entry form 200.

Figure 3:
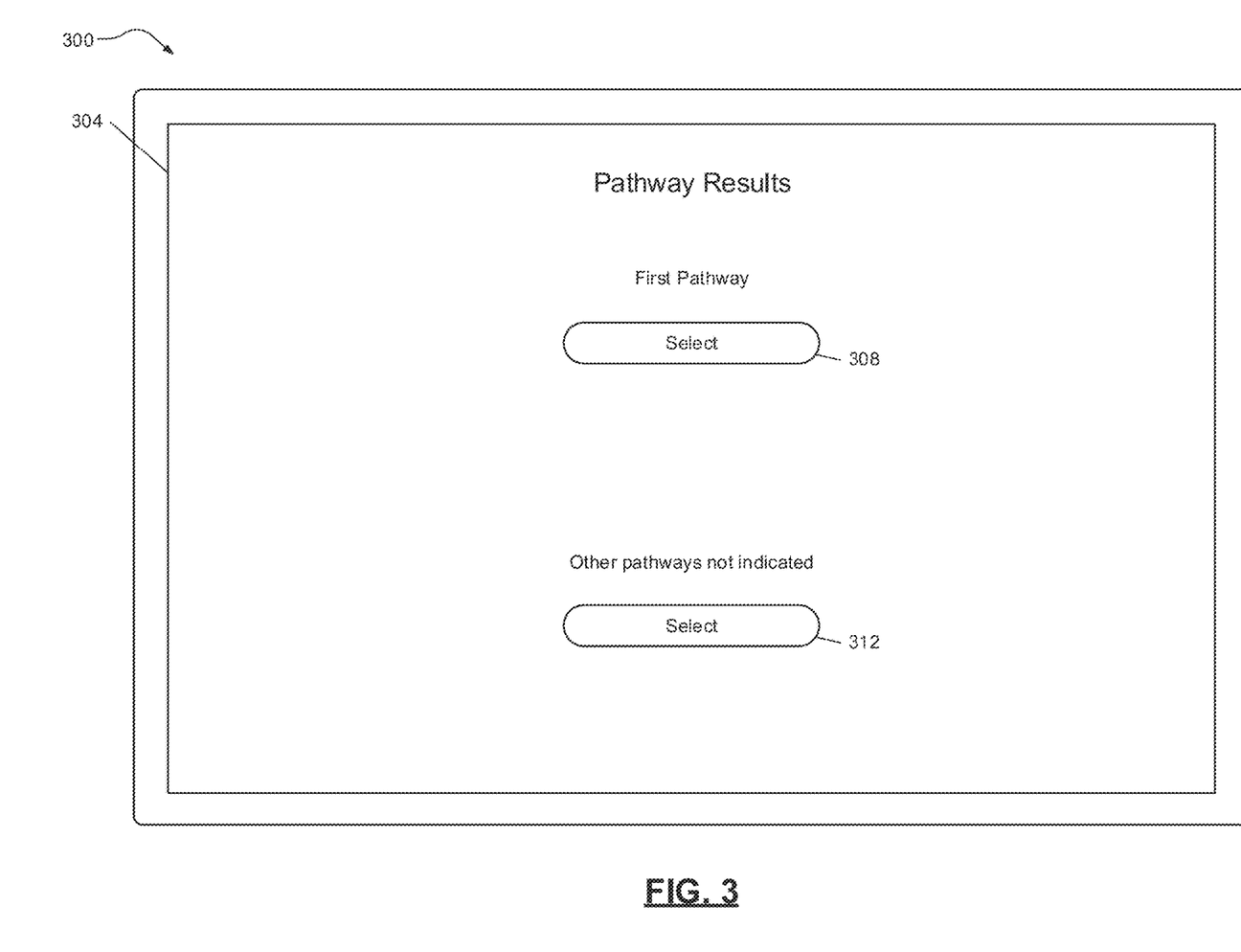
FIG. 3 is an example user interface depicting a results page of a pathway identification system.

FIG. 3 is an example user interface depicting a results page 300 of a pathway identification system. The results page 300 is displayed on a user interface 304 of the operator device 104 of FIG. 1. The displayed pathway results include a first pathway, which the operator can select as the treatment course for the corresponding user by selecting a first select button 308. In various implementations, additional pathways may be included on the results page 300 from which the operator can select. Further, if the operator selects an indicated pathway, the associated insurance organization may have pre-approved the pathway treatment for the user.

Additionally, the operator may select a second select button 312 associated with other pathways that have not been indicated. The user interface may navigate to a page including each pathway that corresponds to the operator's answers but was not indicated as the most valuable pathway. In various implementations, if the operator continues to select a pathway that was not indicated, the pathway identification system generates and transmits a flag to an analyst device. The flag may indicate to an analyst associated with the corresponding insurance organization that the operator selected a pathway that is not pre-approved. Then, the analyst may contact the operator to discuss pathway options.

Figure 4A:
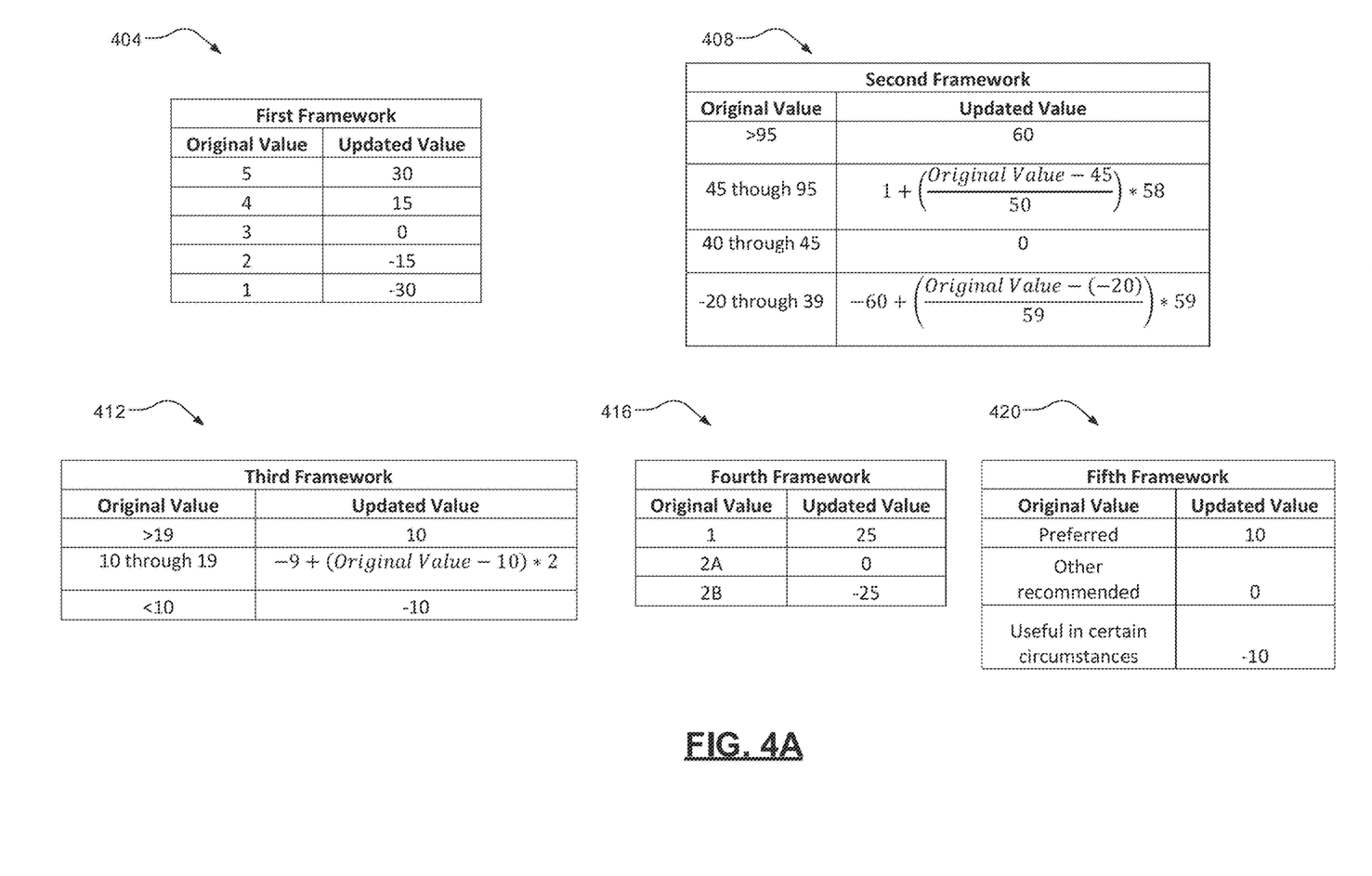
FIG. 4A is a graphical depiction of examples of framework transformations included in a first tier of a database.

FIG. 4A are examples of framework transformations included in a first tier of a database. As previously described, the pathway identification system may include tiered evaluation frameworks stored in the framework database. For example, a first tier of frameworks is shown in FIG. 4A, depicting the frameworks applied to the identified pathways to identify the most valuable pathway. As is described with respect to FIG. 4B, the second tier of evaluation frameworks may only be applied if more than one pathways are within a range of one another.

Within the first tier, a first framework 404 depicts a transformation from existing scoring techniques of, for example, ESMO. The original value is transformed to an updated value within the pathway identification system to determine improved value metrics for each pathway. For example, based on review of peer-reviewed journals, a first pathway is given a particular score by ESMO according to the existing, original structure, such as 4. The pathway identification system stores the existing evaluation of each pathway stored in a database and transforms the corresponding evaluation to match the updated values, for example, 15. For each evaluation framework, a different transformation mapping is determined to normalize the overall value.

For example, the framework database also includes in the first tier a second framework 408 corresponding to ASCO value framework, a third framework 412 corresponding to NCCN evidence blocks, a fourth framework 416 corresponding to NCCN categories of evidence and consensus, and a fifth framework 420 corresponding to NCCN categories of preference. As shown in FIG. 4A, the second framework 408 and the third framework 412 include formula transformations based on the original value of the framework. In various implementations, the formula included in the last row of the second framework 408 for original values from −20 through 39, the formula may be simplified to recite "Original Value—40." The frameworks of the framework database transform the original values to combine and normalize the values and identify which pathway is most valuable based on a variety of criteria.

Figure 4B:
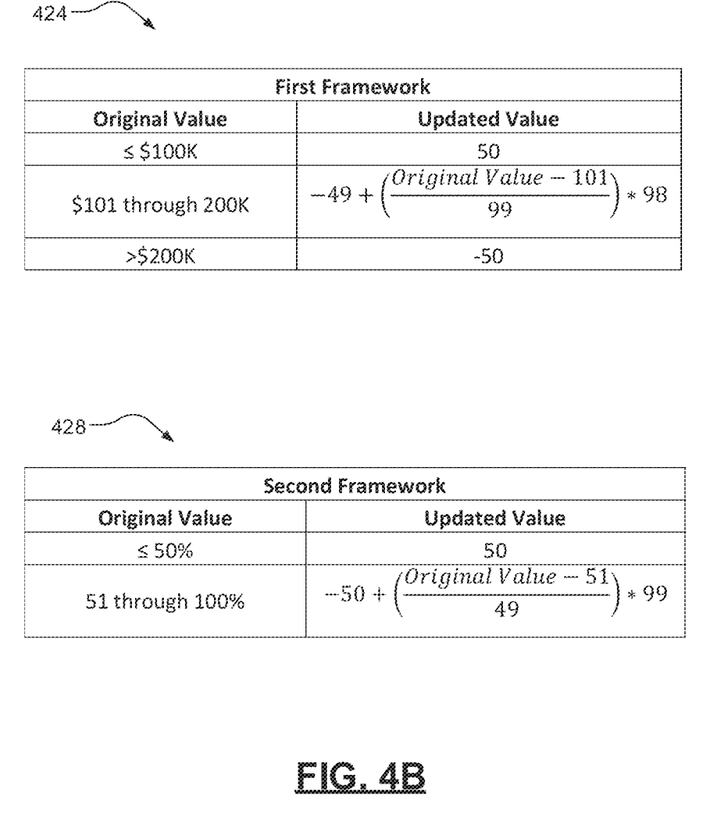
FIG. 4B is a graphical depiction of examples of framework transformations included in a second tier of a database.

FIG. 4B are examples of framework transformations included in a second tier of a database. The second tier includes a first framework 424 corresponding to the institute for clinical and economic review (ICER) quality-adjusted life year and a second framework 428 corresponding to relative cost. Both frameworks in the second tier relate to costs to the user and are implemented if multiple pathways have been identified as valuable to the user (for example, multiple pathways are within a range of one another).

In order to validate the transformations depicted in FIGS. 4A and 4B, each pathway was scored using an original value and scoring structure developed from the above original frameworks and compared to the transformed value. Some notable differences, for example, are that the original frameworks are more positive-leaning, with varying within-criteria value assignments and similar between-criteria value assignments. The weight applied to each evaluation framework is based on indicated importance, the transformed frameworks have zero as a neutral or "mid-range" for each criteria, where points are then given or taken away based on changes to the criteria (within-criteria).

As a result of transforming the evaluation framework, the distribution of values was shifted to be more centered on zero and weighting is also unique to each criteria (between-criteria). For example, the transformed framework may intentionally more heavily weigh a second framework based on clinical indications of the second framework.

The transformed frameworks are generated to result in the overall values being as unique as possible to specific criteria of conditions (for example, based on the answers provided by the operator). This results in few scenarios actually resulting in the same overall value. Transforming the frameworks as described in the present disclosure provides for an obviously higher overall value of a particular pathway, making for easier selection of a pathway.

Figure 5:
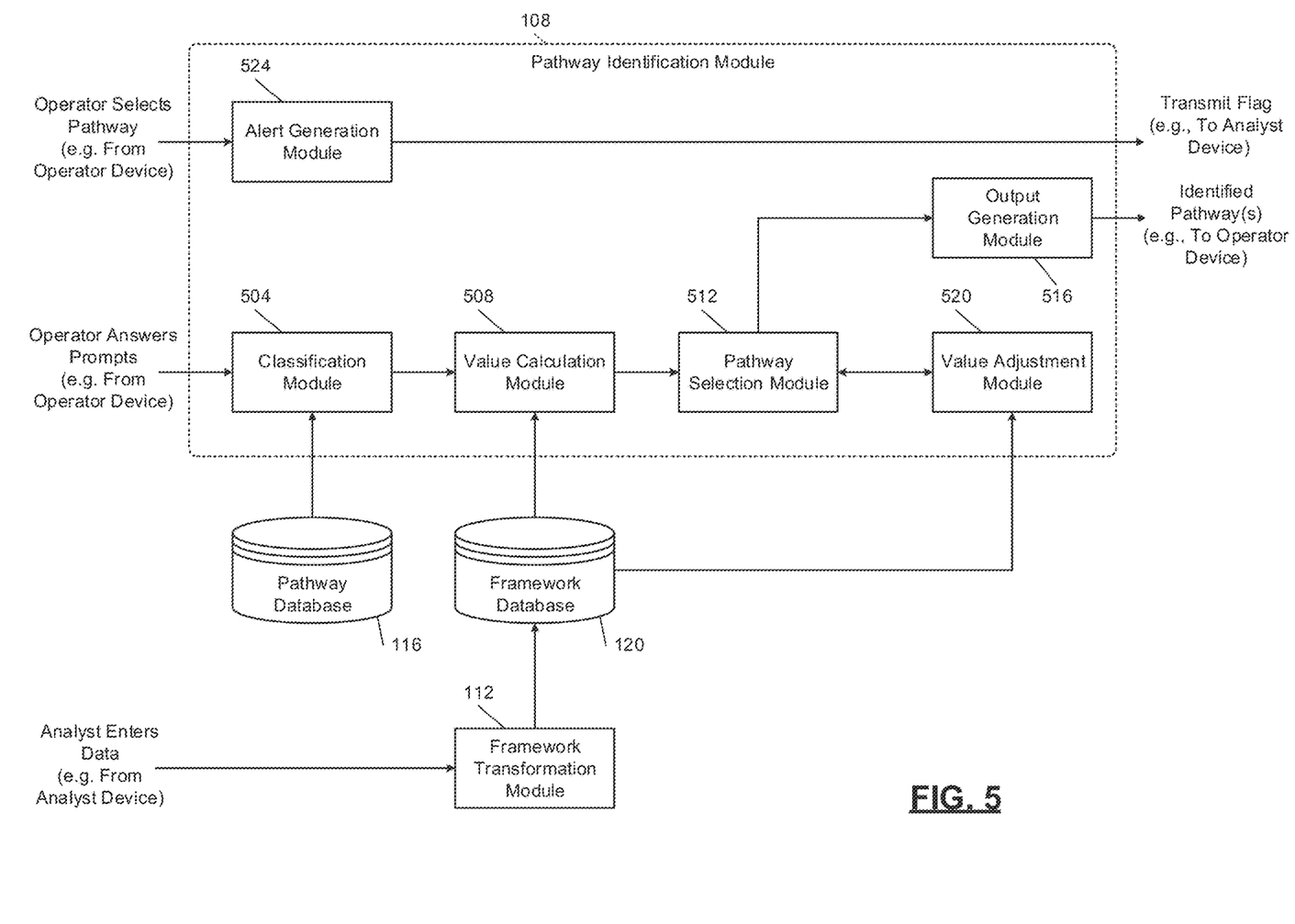
FIG. 5 is a functional block diagram of an example pathway identification module.

FIG. 5 is a functional block diagram of an example pathway identification module 108. The operator submits answers to the questions for pathway identification as described in FIG. 2 to a classification module 504 of the pathway identification module 108. The classification module 504 parses the answers to identify known key terms or phrases, such as diagnoses, with which the pathways stored in the pathway database 116 correspond. The classification module 504 also obtains a set of pathways from the pathway database 116 corresponding to the identified key terms of the answers. For example, the pathways stored in the pathway database 116 may correspond to certain key terms as the pathway would be an option for certain diagnoses, symptoms, etc. The set of pathways are forwarded to a value calculation module 508. The value calculation module 508 obtains the values of each framework stored in the framework database for each pathway of the set of pathways. The value calculation module 508 combines the values to calculate the overall value for each pathway of the set of pathways.

Once an overall value is calculated for each pathway of the set of pathways, the pathways and corresponding overall values are forwarded to a pathway selection module 512. The pathway selection module 512 filters the set of pathways to identify the pathway with the most value. For example, the pathway selection module 512 selects a pathway with a highest overall value. In various implementations, the pathway selection module 512 selects each pathway above a threshold, such as zero. The pathway selection module 512 may forward the selected pathways to an output generation module 516. The output generation module 516 generates and transmits the selected pathway(s) to the operator device to transform the user interface of the operator device to include the selected pathway(s).

In various implementations, if the pathway selection module 512 selects more than one pathway, a value adjustment module 520 adjusts the overall score of the selected pathways based on the second tier frameworks of FIG. 4B, incorporating cost. The value adjustment module 520 adds values determined from transformed framework models of the second tier frameworks to the overall value to generate an adjusted overall value based on cost. The pathway selection module 512 can then apply an adjusted filter to determine which pathway is most valuable. As described previously, in various implementations, the pathway selection module 512 may select the highest adjusted overall value or select multiple adjusted overall values if a difference between the values is less than a range threshold, such as 10. The adjusted selection of pathways may also be forwarded to the output generation module 516 for display on the operator device.

In various implementations, the framework transformation module 124 may provide an analyst access to the framework database 120 to update the framework transformations according updates in peer-reviewed literature, organizational scoring structures, etc. Additionally, the pathway identification module 108 may include an alert generation module 524 that generates an alert or flag if the operator selects a pathway that was not specifically indicated or displayed to the operator, meaning that the operator selected a pathway that was not pre-approved. The alert generation module 524 forwards the flag to an analyst device, such as a mobile phone, tablet, computer, etc. to allow the analyst to contact the operator and discuss the selection.

Figure 6A:
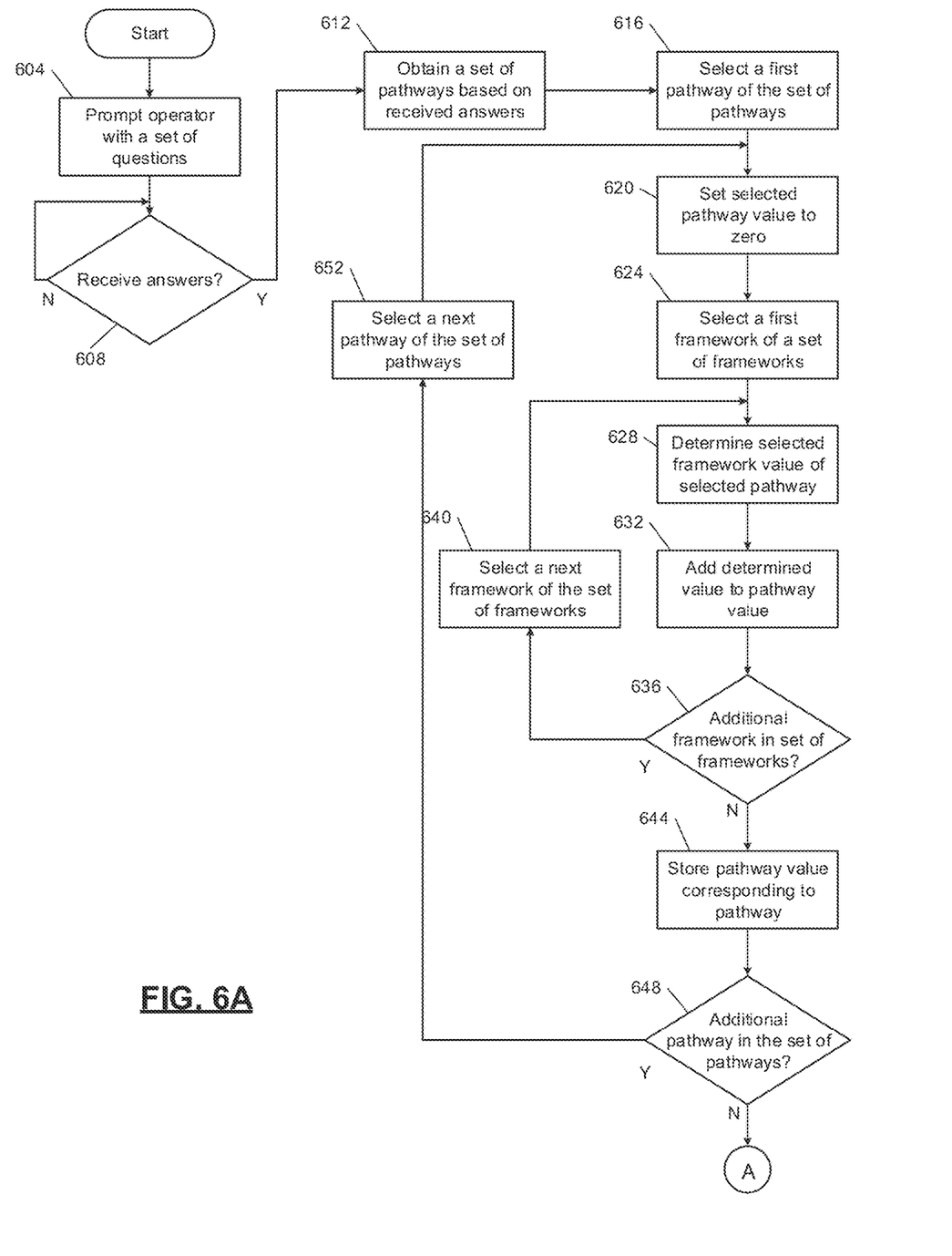
FIGS. 6A and 6B are a flowchart depicting example pathway identification.
Figure 6B:
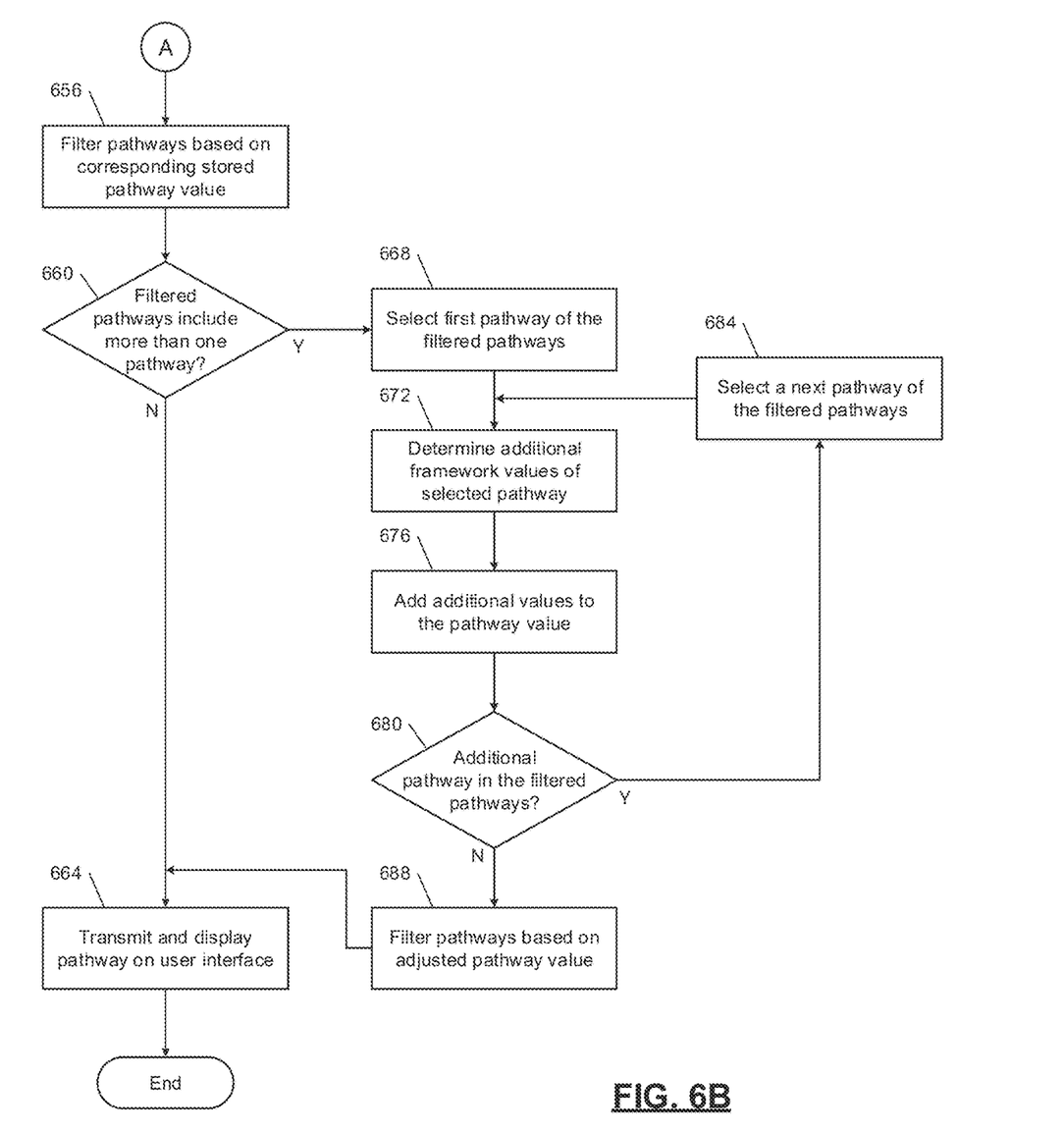

FIGS. 6A and 6B are a flowchart depicting example pathway identification. Control begins at 604 with prompting the operator with a set of questions. For example, the operator may open an application on a computing device with a start page including the set of questions. At 608, control waits to receive answers from the operator. That is, if no, control waits. If yes, control proceeds to 612 to obtain a set of pathways based on the received answers. As described above, the set of pathways may be based on the diagnosis and stage of the user. Further, the set of pathways may be age-specified, symptom-specific, etc.

Control proceeds to 616 to select a first pathway of the set of pathways. Then, control continues to 620 to set a selected pathway value to zero. Control continues to 624 to select a first framework of a set of frameworks. For example, control only selects from the previously described first tier of frameworks. Control proceeds to 628 to determine a selected framework value of the selected pathway. Control then continues to 632 to add the determined value to the pathway value. At 636, control determines if additional frameworks are in the set of frameworks. If yes, control proceeds to 640 to select a next framework of the set of frameworks and returns to 628. Otherwise, control continues to 644 to store the pathway value corresponding to the pathway.

Control continues to 648 to determine if additional pathways are in the set of pathways. If yes, control proceeds to 652 to select a next pathway of the set of pathways. Then, control returns to 620. Otherwise, control proceeds to 656 to filter the pathways based on the corresponding stored pathway value. For example, control may filter the pathways values by selecting the pathways with a pathway value above a threshold. Control continues to 660 to determine if the filtered pathways include more than one pathway. If no, control proceeds to 664 to transmit and display the pathway on the user interface of the operator device. Then, control ends.

Otherwise, control continues to 668 to select a first pathway of the filtered pathways. Control proceeds to 672 to determine the additional or second tier pathway values of the selected pathway. Control continues to 676 to add the additional values to the pathway value. At 680, control determines if additional pathways are included in the filtered pathways. If yes, control continues to 684 to select a next pathway of the filtered pathways and returns to 672. Otherwise, control proceeds to 688 to filter the pathways based on the adjusted pathway value.

Control selects more than one pathway if the adjusted pathways scores are within a range threshold of one another. In various implementations, control selects the highest adjusted pathway value. Alternatively, control selects the pathways with an adjusted pathway score above an adjusted threshold. Control continues to 664 to transmit and display the filtered pathway(s). Then, control ends.

Figure 7:
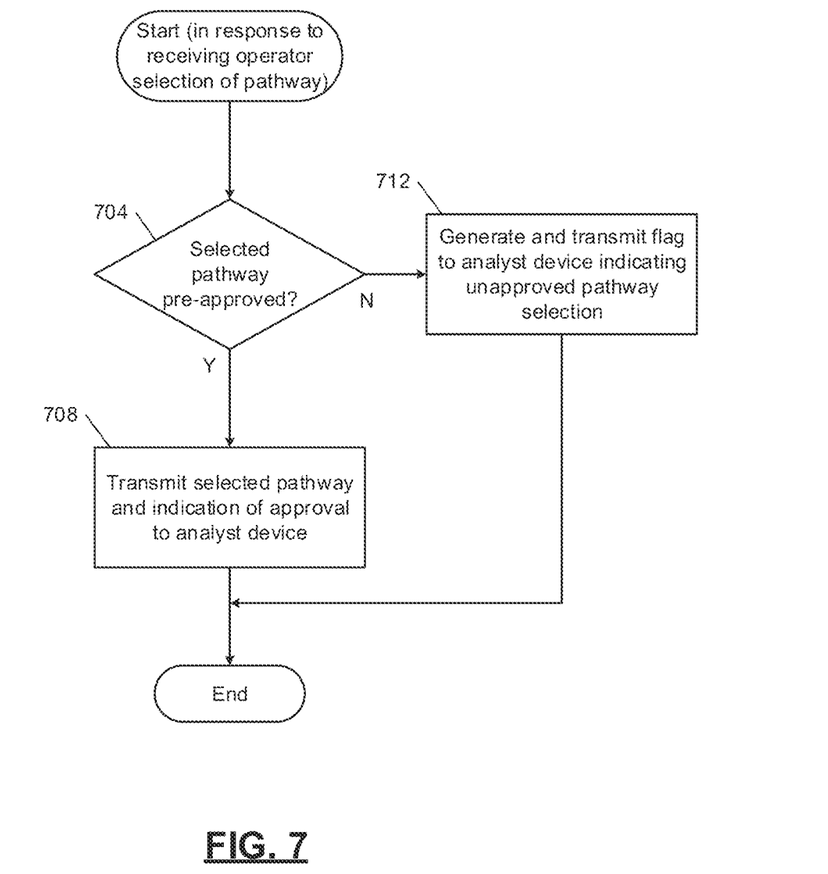
FIG. 7 is a flowchart depicting example flagging of pathways that are not indicated.

FIG. 7 is a flowchart depicting example flagging of pathways that are not indicated. Control begins in response to receiving operator selection of a proposed pathway. Control continues to 704 to determine if the selected pathway is pre-approved. For example, the selected pathway may have been pre-approved by a corresponding insurance organization according to the answers to the original set of questions. If yes, control continues to 708 to transmit the selected pathway and indication of corresponding approval to an analyst device. Then, control ends. Otherwise, control proceeds to 712 to generate and transmit a flag to an analyst device indicating that an unapproved pathway was selected. As previously discussed, the corresponding analyst may then choose to contact the operator and discuss the pathway selection to determine the most prudent course of action for the user. Then, control ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase at least one of A, B, and C should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A pathway identification system, comprising:
a memory component; and
at least one processor communicatively coupled to the memory component and configured to, in response to receiving a first pathway parameter corresponding to a user from an operator device:
from a plurality of pathways, identify a set of the plurality of pathways corresponding to at least one pathway parameter, wherein the set corresponds to the first pathway parameter, and wherein the at least one pathway parameter includes the first pathway parameter;
determine corresponding pathway values for the set, using a first group of framework transformation models;
select at least one pathway of the set, based on the corresponding pathway values;
determine an adjusted pathway value for the at least one pathway of the set, by adding to the corresponding pathway values for the at least one pathway of the set using a second group of framework transformation models based on updates to the first group of framework transformation models;
transmit information encoding the at least one pathway to the operator device;
transform a user interface of the operator device to display the at least one pathway; and
perform a tier-based evaluation by:
using a first tier group of evaluation frameworks associated with first criteria to calculate the corresponding pathway values based on the first criteria, wherein the first group of framework transformation models includes the first tier group of evaluation frameworks;
identifying a subset of pathways; and
using a second tier group of evaluation frameworks associated with second criteria to calculate adjusted pathway values for the subset of pathways based on the second criteria, wherein the adjusted pathway value for the at least one pathway includes the adjusted pathway values for the subset of pathways.

2. The pathway identification system of claim 1, wherein:
the memory component is configured to store a pathway database including the plurality of pathways corresponding to the at least one pathway parameter; and
the at least one processor is further configured to:
obtain, from the pathway database, (i) pathway data for the plurality of pathways, and (ii) parameter data for the at least one pathway parameter; and
identify the set, based on the pathway data and the parameter data obtained from the pathway database.

3. The pathway identification system of claim 1, wherein:
the memory component is configured to store a framework database including the first group of framework transformation models and the second group of framework transformation models; and
the at least one processor is further configured to:
obtain the first group of framework transformation models and the second group of framework transformation models from the framework database; and
using the first group of framework transformation models and the second group of framework transformation models to determine the corresponding pathway values for each of the set and the adjusted pathway value for each of the set.

4. The pathway identification system of claim 3, wherein the at least one processor is further configured to:
identify a subset of pathways associated with one or more of the corresponding pathway values above a threshold, wherein the at least one pathway of the set of the plurality of pathways includes the subset of pathways; and
in response to the subset of pathways including more than one pathway, obtain the second group of framework transformation models from the framework database.

5. The pathway identification system of claim 1, wherein each pathway of the subset of pathways is associated with a subset of the corresponding pathway values that fall within a range threshold.

6. The pathway identification system of claim 1, wherein each pathway of the subset of pathways is associated with a subset of the corresponding pathway values that are greater than a threshold.

7. The pathway identification system of claim 6, wherein the at least one processor is further configured to:

filter the subset of pathways to generate a filtered subset, based on the adjusted pathway values of the tier-based evaluation;
identify a set of high-valued pathways based on the filtered subset;
transmit the information encoding the set of high-valued pathways to the operator device; and
transform the user interface of the operator device to display the set of high-valued pathways, wherein the at least one pathway comprises the set of high-valued pathways.

8. The pathway identification system of claim 6, wherein the at least one processor is further configured to:
select a final pathway of the subset of pathways based on the adjusted pathway values; and
transmit the information encoding the final pathway to the operator device to transform the user interface of the operator device.

9. The pathway identification system of claim 1, wherein the at least one processor is further configured to generate a first user-selectable link corresponding to the at least one pathway.

10. The pathway identification system of claim 9, wherein the at least one processor is further configured to, in response to receiving a first selection of the first user-selectable link,
transmit the first selection to a corresponding entity; and
display approval of the first selection, via the user interface of the operator device.

11. A method comprising, in response to receiving a first pathway parameter corresponding to a user from an operator device:
from a plurality of pathways, identifying a set of the plurality of pathways corresponding to at least one pathway parameter, wherein the set corresponds to the first pathway parameter, and wherein the at least one pathway parameter includes the first pathway parameter;
determining corresponding pathway values for the set, using a first group of framework transformation models;
selecting at least one pathway of the set, based on the corresponding pathway values;
determining an adjusted pathway value for the at least one pathway of the set, by adding to the corresponding pathway values for the at least one pathway of the set using a second group of framework transformation models based on updates to the first group of framework transformation models;
transmitting information encoding the at least one pathway to the operator device;
transforming a user interface of the operator device to display the at least one pathway; and
perform a tier-based evaluation by:
using a first tier group of evaluation frameworks associated with first criteria, to calculate the corresponding pathway values based on the first criteria, wherein the first group of framework transformation models includes the first tier group of evaluation frameworks;
identifying a subset of pathways; and
using a second tier group of evaluation frameworks associated with second criteria, to calculate adjusted pathway values for the subset of pathways, based on the second criteria, wherein the adjusted pathway value for the at least one pathway includes the adjusted pathway values for the subset of pathways.

12. The method of claim 11, further comprising:
obtaining (i) pathway data for the plurality of pathways, and (ii) parameter data for the at least one pathway parameter from a pathway database; and
identify the set, based on the pathway data and the parameter data obtained from the pathway database.

13. The method of claim 11, further comprising:
obtaining the first group of framework transformation models and the second group of framework transformation models from a framework database; and
using the first group of framework transformation models and the second group of framework transformation models to determine the corresponding pathway values for each of the set and the adjusted pathway value for each of the set.

14. The method of claim 13, further comprising:
identifying a subset of pathways associated with one or more of the corresponding pathway values above a threshold, wherein the at least one pathway of the set of the plurality of pathways includes the subset of pathways; and
in response to the subset of pathways including more than one pathway, obtaining the second group of framework transformation models from the framework database.

15. The method of claim 11,
wherein each pathway of the subset of pathways is associated with a subset of the corresponding pathway values within a range threshold.

16. The method of claim 15, further comprising:
filtering the subset of pathways to generate a filtered subset, based on the adjusted pathway values of the tier-based evaluation;
identifying a set of high-valued pathways based on the filtered subset;
transmitting the information encoding the set of high-valued pathways to the operator device; and
transforming the user interface of the operator device to display the set of high-valued pathways, wherein the at least one pathway comprises the set of high-valued pathways.

17. The method of claim 15, further comprising:
selecting a final pathway of the subset of pathways based on the adjusted pathway values; and
transmitting the information encoding the final pathway to the operator device to transform the user interface of the operator device.

18. A non-transitory, computer-readable medium comprising instructions that, when executed by a processor, perform a method including, in response to receiving a first pathway parameter corresponding to a user from an operator device:
from a plurality of pathways, identifying a set of the plurality of pathways corresponding to at least one pathway parameter, wherein the set corresponds to the first pathway parameter, and wherein the at least one pathway parameter includes the first pathway parameter;
obtaining a first group of framework transformation models and a second group of framework transformation models from a framework database;
determining corresponding pathway values for the set, using the first group of framework transformation models;
selecting at least one pathway of the set, based on the corresponding pathway values;
determining an adjusted pathway value for the at least one pathway of the set, by adding to the corresponding pathway values for the at least one pathway of the set using the second group of framework transformation models based on updates to the first group of framework transformation models;

transmitting information encoding the at least one pathway to the operator device;

transforming a user interface of the operator device to display the at least one pathway; and performing a tier-based evaluation by:
    using a first tier group of evaluation frameworks associated with first criteria, to calculate the corresponding pathway values based on the first criteria, wherein the first group of framework transformation models includes the first tier group of evaluation frameworks;
    identifying a subset of pathways; and
    using a second tier group of evaluation frameworks associated with second criteria, to calculate adjusted pathway values for the subset of pathways, based on the second criteria, wherein the adjusted pathway value for the at least one pathway includes the adjusted pathway values for the subset of pathways.

19. The non-transitory, computer-readable medium of claim 18, wherein the method includes:
    wherein each pathway of the subset of pathways is associated with one or more of the corresponding pathway values above a threshold; and
    in response to the subset of pathways including more than one pathway, obtaining the second group of framework transformation models from the framework database.

20. The non-transitory, computer-readable medium of claim 18, wherein the method includes:
    filtering the subset of pathways to generate a filtered subset, based on the adjusted pathway values of the tier-based evaluation;
    identifying a set of high-valued pathways based on the filtered subset;
    transmitting the information encoding the set of high-valued pathways to the operator device; and
    transforming the user interface of the operator device to display the set of high-valued pathways, wherein the at least one pathway comprises the set of high-valued pathways.

\* \* \* \* \*